(12) United States Patent
Tyrrell

(10) Patent No.: US 7,872,770 B2
(45) Date of Patent: Jan. 18, 2011

(54) PRINTING SYSTEM AND METHOD FOR COMBINING MULTIPLE PRINT JOBS INTO A SINGLE COMPOUND PRINT JOB

(75) Inventor: Andrew Tyrrell, Chipping (GB)

(73) Assignee: Xerox Corporation, Norwalk, CT (US)

( * ) Notice: Subject to any disclaimer, the term of this patent is extended or adjusted under 35 U.S.C. 154(b) by 1148 days.

(21) Appl. No.: 11/171,937

(22) Filed: Jun. 30, 2005

(65) Prior Publication Data

US 2007/0002350 A1   Jan. 4, 2007

(51) Int. Cl.
G06F 3/12 (2006.01)
(52) U.S. Cl. .................. 358/1.15; 358/1.1; 358/1.12; 358/1.13; 358/1.14; 358/1.18; 358/1.9; 399/1; 715/209; 715/700
(58) Field of Classification Search ............... 358/1.15, 358/1.1, 1.13, 1.18; 715/209, 500
See application file for complete search history.

(56) References Cited

U.S. PATENT DOCUMENTS

| | | | |
|---|---|---|---|
| 5,129,639 A | | 7/1992 | DeHority |
| 5,500,715 A | | 3/1996 | Ta et al. |
| 5,579,087 A | * | 11/1996 | Salgado ................. 399/1 |
| 5,604,600 A | | 2/1997 | Webster |
| 5,710,635 A | | 1/1998 | Webster et al. |
| 5,983,270 A | * | 11/1999 | Abraham et al. ........... 709/224 |
| 6,674,540 B1 | | 1/2004 | Wiechers et al. |
| 6,873,426 B1 | | 3/2005 | Farrell |
| 2002/0052897 A1 | * | 5/2002 | Nishikawa et al. .......... 707/527 |
| 2002/0131069 A1 | * | 9/2002 | Wanda ................... 358/1.14 |
| 2003/0011802 A1 | * | 1/2003 | Nakagiri et al. ............ 358/1.13 |
| 2004/0114184 A1 | * | 6/2004 | Sugiyama ................ 358/1.18 |
| 2004/0177336 A1 | * | 9/2004 | Kujirai ................... 717/104 |
| 2004/0184060 A1 | | 9/2004 | Nathan |
| 2005/0100378 A1 | * | 5/2005 | Kimura et al. .............. 400/76 |
| 2005/0111024 A1 | * | 5/2005 | Ferlitsch .................. 358/1.13 |

* cited by examiner

Primary Examiner—King Y Poon
Assistant Examiner—David S Cammack
(74) Attorney, Agent, or Firm—Fay Sharpe LLP

(57) ABSTRACT

A printing system includes a printer and at least one workstation operatively connected to the printer. The work station comprises at least one input/output device connecting the workstation to the printer, a controller connected to the at least one input/output device, and a memory connected to the controller. The workstation further includes an operating system, a first application, a second application, and a print driver, all residing on the memory. A first item of the first application and a second item of the second application are both receivable by the print driver. The print driver is selectively able to concatenate the first and second items into a compound print set, able to receive a selected number of copies to be printed of the compound print set entered through the at least one input/output device and able to submit the compound print set and the selected number of copies as a single print job to the printer. Finishing attributes are able to be applied to the compound print set for processing by the printer.

18 Claims, 8 Drawing Sheets

PRINTING SYSTEM AND METHOD FOR COMBINING MULTIPLE PRINT JOBS INTO A SINGLE COMPOUND PRINT JOB

BACKGROUND

Exemplary embodiments discussed herein relate generally to a printing system and, more particularly, to a printing system and method for printing independent items from one or more applications, typically printed as separate and unique print jobs, as a single print job. These embodiments find particular application in a printing system employing an electrophotographic imaging machine and will be described with particular reference thereto. It is to be appreciated, however, that the exemplary embodiments discussed herein are also amenable to other like applications.

In a typical printing system employing an electrophotographic imaging machine, such as an electrophotographic copier, printer, combination copier/printer, etc., a photoconductive insulating member is charged to a substantially uniform potential and thereafter exposed to a light image representative of a document to be produced. This exposure discharges the photoconductive insulating surface in exposed or background areas and creates an electrostatic latent image on the member, corresponding to image areas of the document to be produced. Subsequently, the electrostatic latent image on the photoconductive insulating surface is made visible by developing the image with developing powder referred to in the art as toner. This developed image may be subsequently transferred to a print medium, such as a sheet of copy paper, to which it may be permanently affixed by heating and/or by the application of pressure, i.e., fusing.

Printing systems, including those that employ one or more electrophotographic imaging machines as generally described above, can sometimes employ a scanner for scanning image-bearing documents, i.e., source documents, and conversion electronics for converting an image scanned from a source document to image signals or pixels. Alternatively, image signals or pixels representative of an image or document to be printed can be generated directly on a computer or like device, without the need for a source document. In either case, the signals are typically stored and read out successively to the printing system for formation of the images on photoconductive output media, such as a photoreceptor, and ultimately transfer to a support substrate, such as described above.

Sometimes, a user of such a printing system desires to print multiple items from one or more programs or applications for assemblage into a single compound document. For example, the user may want to print a first item from a word processing program and a second item from a graphics or photo editing program. Typically, the first and second items are sent to the printer of a printing system as separate print jobs, i.e., a first print job corresponds to the first item and a second print job corresponds to the second item. The first and second print jobs are then individually processed by the printer and output documents or media corresponding to each print job are generated. After the output documents are generated, the user can manually assemble the two documents into a single document and apply any desired finishing (e.g., stapling) to the single document.

This process become more tedious when a user desires to create multiple copies of the single compound document using the printer system. For example, a user may desire to create three (3) copies of a compound document, wherein the compound document comprises three (3) items from one or more programs or applications. Typically, in such a case, the user would be required to print three copies of a first item, three copies of second item and three copies of a third item. The printed items would then need to be manually separated and assembled or built into three copies of the compound document (i.e., collated) and any desired finishing applied to the compound document copies. Thus, each copy of the compound document would then include one copy of the first item, one copy of the second item and one copy of the third item.

Other difficulties could be encountered during printing of the items to be included in the compound document. For example, if the user is employing a printer system in a multiple user networked environment, other users may print items that could become interleaved with the items being printed for inclusion in one or more copies of a compound document. Such interleaved items would need to be removed by the user when separating and assembling the compound document copy or copies. Additionally, if banner sheets (i.e., a cover or lead sheet associated with each print job) are employed by the printer system, each banner sheet will need to be removed by the user when separating and assembling the compound document or documents.

BRIEF DESCRIPTION

In one exemplary embodiment, a method is provided for concatenating at least two independent items into a compound print set to be printed as a single print job to create one or more printed copies of a compound document. In the method, a compound print set comprising a first item and a second item is created. The compound print set is representative of a compound print document. A number of copies of a compound document to, be printed from the compound print set is selected. The compound print set and the selected number of copies are submitted as a single print job to the printer to be printed.

In another exemplary embodiment, a method is provided for combining at least two independent items from one or more applications as a single print job. In the method, a selected first item to be included in a compound print document is received. A selected second item to be included in the compound print document is received. The items are concatenated into a compound print set representative of the compound print document. A selected number of copies of the compound document to be printed is received. The compound print set and the selected number of copies are submitted as a print job to a printer.

In yet another exemplary embodiment, a printing system includes a printer and at least one workstation operatively connected to the printer. The work station comprises at least one input/output device connecting the workstation to the printer. A controller is connected to the at least one input/output device. A memory is connected to the controller. The workstation includes an operating system, a first application, a second application, and a print driver, all residing on the memory. A first item of the first application and a second item of the second application are both receivable by the print driver. The print driver is selectively able to concatenate the first and second items into a compound print set, able to receive a selected number of copies to be printed of the compound print set entered through the at least one input/ output device and able to submit the compound print set and the selected number of copies as a single print job to the printer.

DETAILED DESCRIPTION

Figure 1:
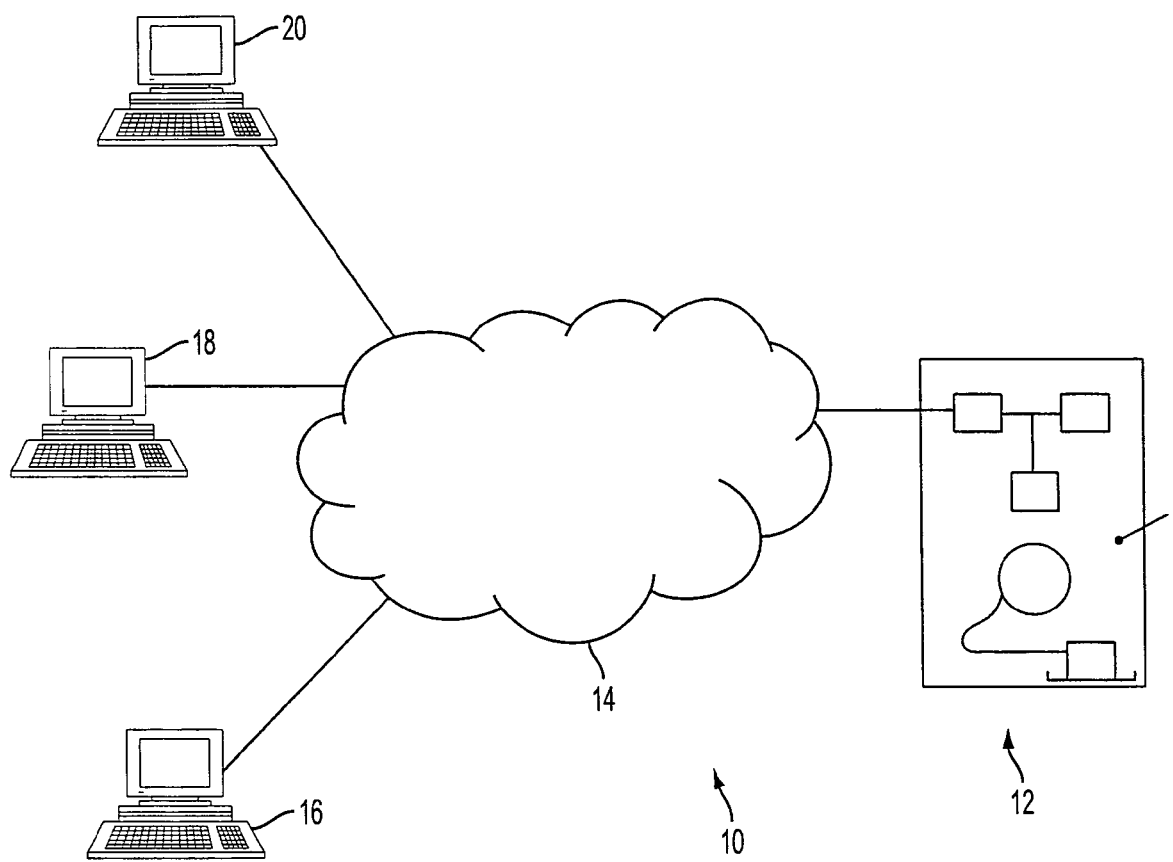
FIG. 1 is a schematic view of a printing system including one or more workstations connected to a printer, through a network, for printing independent items from one or more applications as a single print job.

Referring now to the drawings wherein the showings are for purposes of illustrating one or more exemplary embodiments, a printing system is schematically depicted in FIG. 1 and generally indicated by reference numeral 10. The system includes a printer 12 connected or linked to a network 14, such as an intranet or the Internet, for example. The system 10 further includes one or more workstations or workstation devices (e.g., personal computers) connected or linked to the network 14 and to the printer 12 through the network. In the illustrated embodiment, the one or more workstations or workstation devices include a first workstation 16, a second workstation 18, and a third workstation 20.

The word "printer" is used in connection with the one or more exemplary embodiments discussed herein to generally refer to or encompass any apparatus, such as a digital copier, bookmaking machine, facsimile machine, multi-function machine, etc. which performs a print outputting function for any purpose. The word "linked" is used in connection with the one or more exemplary embodiments discussed herein to generally refer to a wired or wireless link or other means capable of supplying or communicating electronic data to and/or from the connected/linked elements. For example, the links between elements can be telephone lines, computer cables, ISDN lines, wireless communication means or links (e.g., employing Bluetooth® wireless technology) and the like.

While the illustrated system 10 shows the printer 12 as an electrophotographic printer and particular reference herein is made to printer 12 including an electrophotographic marking engine, printer 12 can alternatively be an ink-jet printer, a solid ink printer, a thermal head printer used in conjunction with heat sensitive paper, or any other device capable of marking an image on a substrate. It is to be appreciated that such alternative marking machines can, like printer 12, include an input/output interface, a memory, a marking cartridge platform, a marking driver, a function switch, sensors, a controller and a self-diagnostic unit, all of which can be interconnected by a data/control bus. Additionally, it is to be appreciated that, though the printer 12 is schematically shown in a configuration which would employ only a single marking engine, alternate printers employable in the system 10 could include multiple marking engines and related components.

Figure 2:
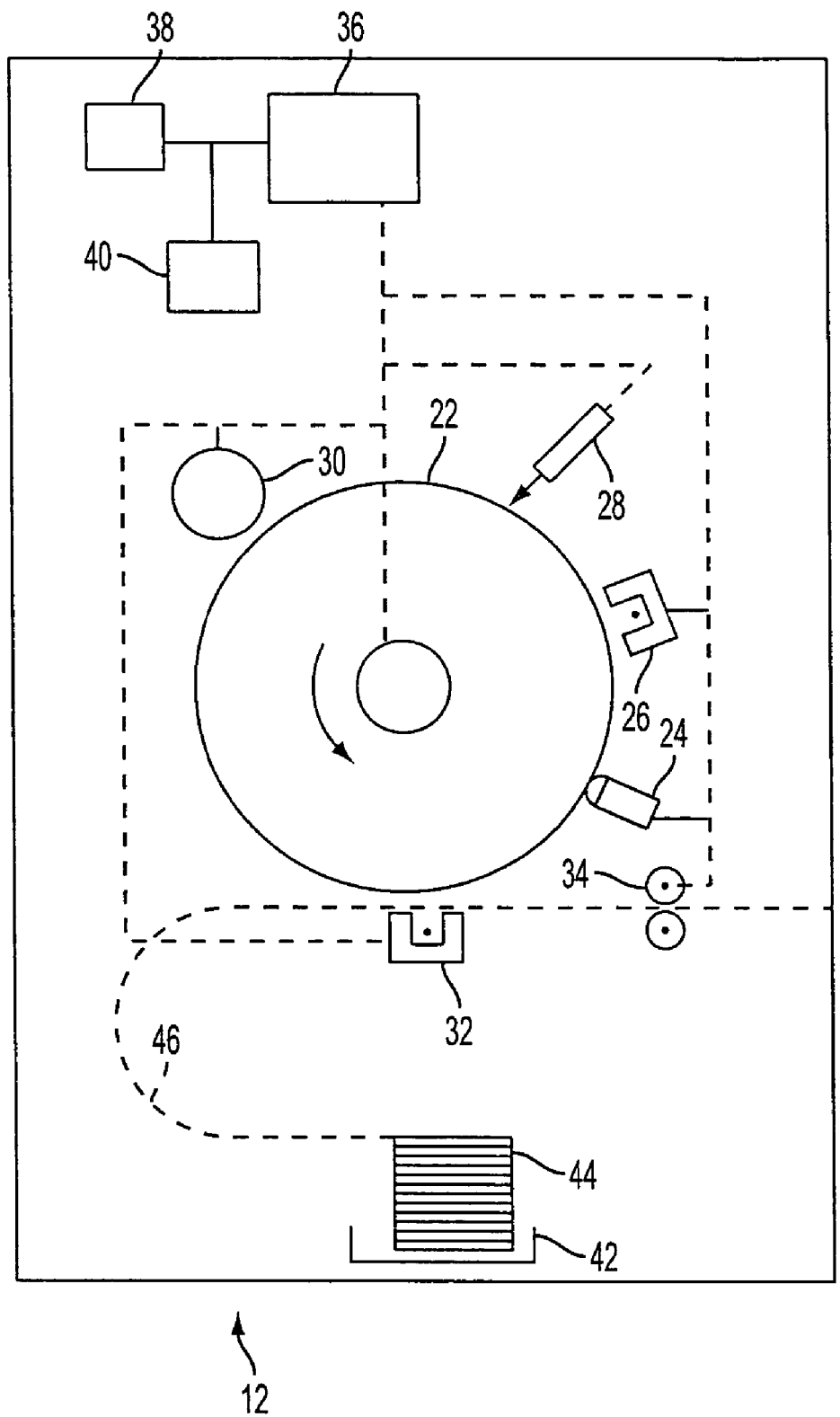
FIG. 2 is an enlarged schematic view of the printer of FIG. 1.

In the illustrated embodiment, the printer 12 of the printing system 10 can be a xerographic imaging machine. With additional reference to FIG. 2, the printer 12 of the illustrated embodiment includes many of the hardware elements or components employed in the creation of desired images by electrophotographical processes, as will be known and understood by those skilled in the art. In the illustrated embodiment, for example, the printer 12 includes a charge retentive surface member, such as rotating photoreceptor 22 in the form of a drum, for example (alternatively, the rotating photoreceptor could be a belt or other rotating device having a charge retentive surface).

As also known and understood by those skilled in the art, images can be created on the photoreceptor 22 and ultimately transferred from the photoreceptor 22 to print media, such as a sheet of paper. The term "print media" is used in connection with the one or more exemplary embodiments discussed herein to generally refer to a usually flimsy physical sheet of paper, plastic, or other suitable physical print media substrate for images, whether precut or web fed. Disposed about the photoreceptor 22 are various xerographic subsystems, including a cleaning device or station 24, a charging station 26, an exposure station 28, which forms a latent image on the photoreceptor 22, a developer 30 for developing the latent image by applying a toner thereto to form a toner image, a transferring unit, such as a transfer corotron 32, which transfers the toner image thus formed to the print media, and a fuser 34, which fuses the transferred image to the print media. In the illustrated embodiment, the fuser 34 is adapted to apply at least one of heat and pressure to the print media to physically and permanently attach the toner and optionally to provide a level of gloss to the printed media. In any particular embodiment of an electrophotographic marking machine usable in place of printer 12, there can be variations to that described above, such as, for example, additional corotrons, cleaning devices, or, in the case of a color printer, multiple developers.

The xerographic subsystems 24, 26, 28, 30, 32, 34 of the illustrated embodiment are controlled by a marking engine controller 36, such as a CPU. Though the controller 36 of the illustrated embodiment is schematically shown as a single unit, it is to be appreciated that the controller can be distributed throughout the marking machine 12 and formed of multiple remotely positioned components. For example, actuators forming the controller 36 can be located in or on the xerographic subsystems and thus the controller is not necessarily physically removed from or separate from other elements of the marking machine 12. In the illustrated embodiment, the marking engine controller 36 is linked to an input/output interface 38 and a memory 40, and may also be linked to other components known by those skilled in the art to be provided with a marking engine printer, such as, for example, a marking cartridge platform, a marking driver, a function switch, sensors (such as an "out of paper" indicator), a self-diagnostic unit, all of which can be interconnected by a data/control bus.

The schematically illustrated printer 12 further includes a print media tray 42 suitable for holding print media, such as a stack 44 of precut print media sheets. As is known and understood by those skilled in the art, print media sheets are fed, typically from the top of the stack 44, along sheet path 46 to the transfer station 32 for receiving the toner image and through the fuser 34 for having the toner image permanently attached thereto. Although not illustrated, it is to be appreciated that the printer 12 could be configured to employ duplex operations on a print media sheet, wherein the sheet could be inverted and then fed for recirculation back through the transfer station 32 and the fuser 34 for receiving and permanently fixing a side two image to the backside of that duplex sheet. It should also be appreciated that printer 12 need not be limited to a single print media tray, and could alternatively have no tray wherein the printer 12 could be fed by a separate feeder or the like, or could have two or more trays, such as trays for holding print media sheets of varying types (e.g., sizes, material, etc.).

The workstations 16, 18,20 can be any device capable of communicating with the printer 12 over the network 14. For example, the workstations 16, 18,20 can be personal computers, wherein each workstation has an input/output interface for communicating with the network 14, a controller or CPU, a memory, a display screen and a keyboard. Of course, the workstations can be other types of devices capable of communicating with the printer 12 over the network. For example one or more of the workstations could be a PDA, mobile phone or any other suitable device connected to the network 14 via with wires, wirelessly or otherwise.

Figure 3:
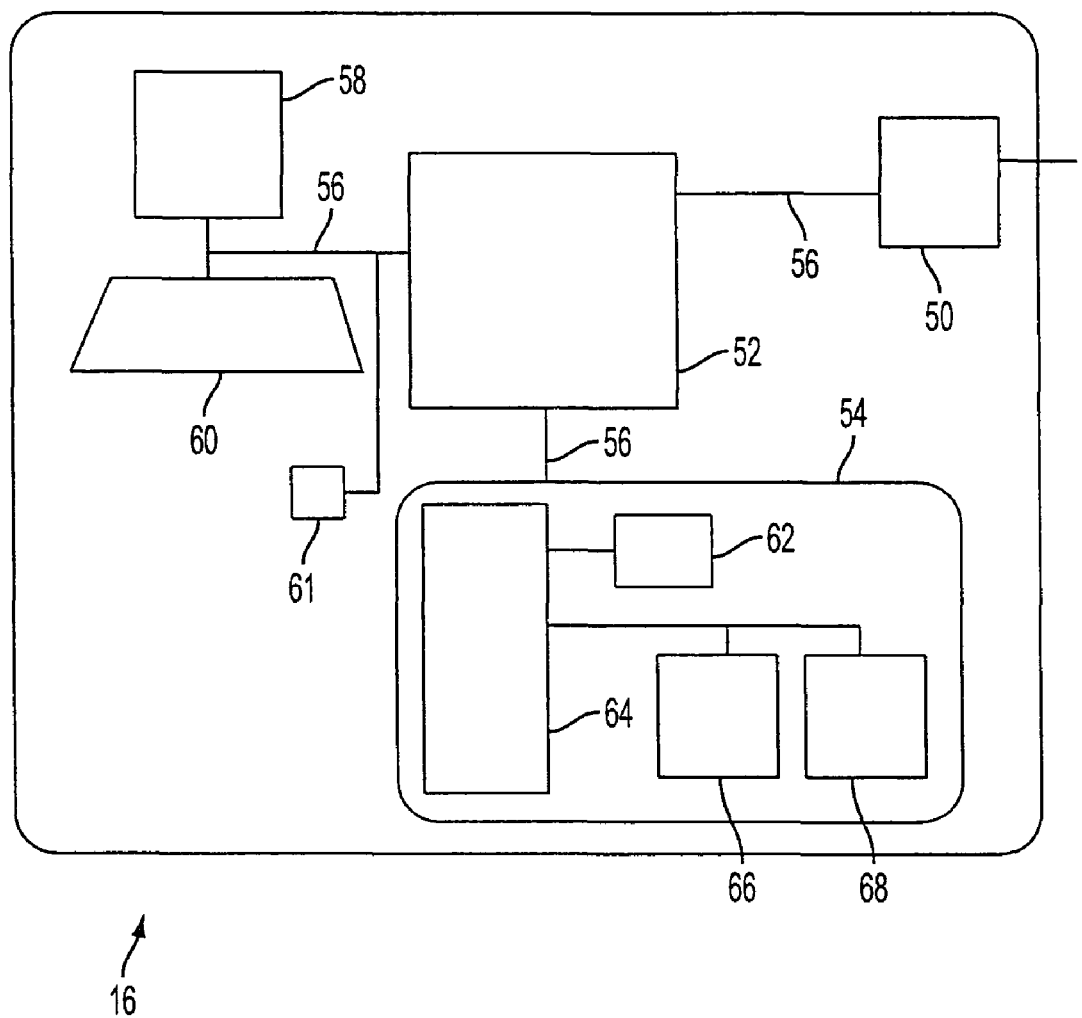
FIG. 3 is an enlarged and more detailed schematic view of one of the workstations of FIG. 1.

Only workstation 16 is described in further detail herein, but it is to be appreciated that the workstations 18 and 20 could be the same or similar to workstation 16. With further reference to FIG. 3, the workstation 16 can be a personal computer and, in the illustrated embodiment, includes a first input/output interface 50 for linking the workstation to the network 14, a controller 52 (such as a CPU), and a memory 54, all interconnected by links 56. The workstation 16 can include additional input/output interfaces, such as display screen 58, a keyboard 60 and a mouse 61, for example. The workstation 16 is associated with a print driver 62, which can be retained in the workstation's memory 54. The memory 54 can additionally retain an operating system 64 and one or more applications (such as software applications), including first application 66 and second application 68 in the illustrated embodiment, capable of generating documents, sheets or images to be printed.

The print driver 62 can be a software program that enables the workstation 16 to communicate with the printer 12, including submitting information to be printed by the printer 12. More specifically, the print driver 62 can act as a translator between the applications 66,68 of the workstation 16 and the printer 12. For example, when the first application 66 is used to generate a document or image to be printed, the application 66 communicates and/or delivers the document or image to be printed through the print driver 62 to the printer 12.

The operating system 64 can be a conventional Windows® operating system which can coordinate usage of a single print driver, such as print driver 62, with multiple applications, such as applications 66,68, for use in association with a specified printer, such as printer 12. Alternatively, the applications 66 and/or 68 can include their own print drivers or code to communicate with the printer 12. Of course, as will be appreciated by those skilled in the art, one or more applications and/or one or more print drivers usable by the workstation 16 can reside in locations other than the memory 54, such as on some other device connected to the network 14 (e.g., a remote server). For example, applications or print drivers can be Internet or web-based.

As will be described in more detail below, the workstations 16, 18,20 can be used to generate print jobs, which each generally include image data to be printed in the form of a plurality of electronic pages and a set of processing instructions. The term "print job" is used in connection with the one or more exemplary embodiments discussed herein to generally refer to a set of related sheets to be printed from a particular user, or which are otherwise related. Processing instructions of a print job can, for example, include the number of copies desired, the size and type of each print media sheet to be printed on, whether simplex or duplex printing is required, etc.

To generate a print job corresponding to one item on the workstation 16 from a single application, such as application 66, the application 66 is used to generate, retrieve and/or retrieve and modify an image or images to be printed (representative of the one item to be printed). Within the application, a print command is executed, such as by selecting "print" from a pull-down menu via mouse 61, entering a print command via the keyboard 60, etc. Executing a print command causes the operating system 64 to employ a selected print driver, print driver 62 in the illustrated embodiment, for use with the designated printer, printer 12 in the illustrated embodiment. The print driver 62 can allow the set of processing instructions to be associated with the image or images to be printed, thereby creating a print job corresponding to the one item to be printed. The print driver 62 then communicates the print job to the printer 12 for processing (and eventually printing a document corresponding to the image or images that were to be printed).

Figure 4:
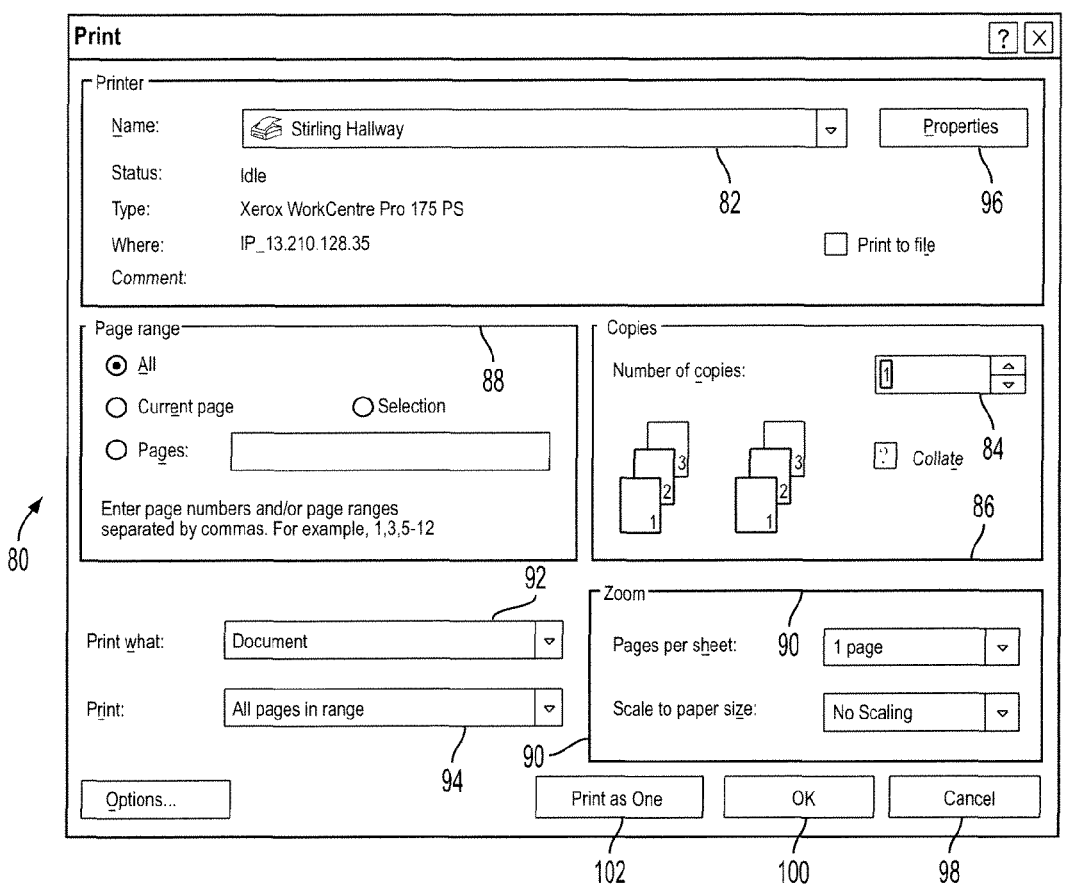
FIG. 4 is a print menu associated with a print driver of the workstation of FIG. 3.

With reference to FIG. 4, an exemplary print driver pop-up menu 80 is illustrated. The menu 80 can be displayed on the display screen 58 when a print command is executed in one of the applications 66,68 and the print driver 62 is accessed by the operating system 64. The menu 80 can be an interface through which a user can communicate and/or interact with the print driver 62. As is well known by those skilled in the art, the menu 80 can be changed through the keyboard 60, the mouse 61 or other devices or means to select or create the processing instructions to be associated with a print job being created when executing the print command in one of the applications 66,68.

For example, the printer to be used and communicated with by the print driver 62 can be specified using pull-down list icon 82. The number of copies to be printed can be specified using the copy window 84, as well as other copy related parameters in box 86. In addition, page range parameters can be specified in box 88, zoom parameters can be specified in box 90 and precisely what is to be printed can be specified at 92 and 94. Several push buttons are also provided in the illustrated embodiment, including a properties button 96, a cancel button 98, an "OK" button 100, which functions to instruct the print driver 62 to send the print job to the printer 12. Of course, as will be known and appreciated by those skilled in the art, additional functions (or fewer functions) than those illustrated can be employed in a menu associated with the print driver 62. Menu 80 is provided merely to illustrate one example menu that can be associated with a print driver.

Figure 5:
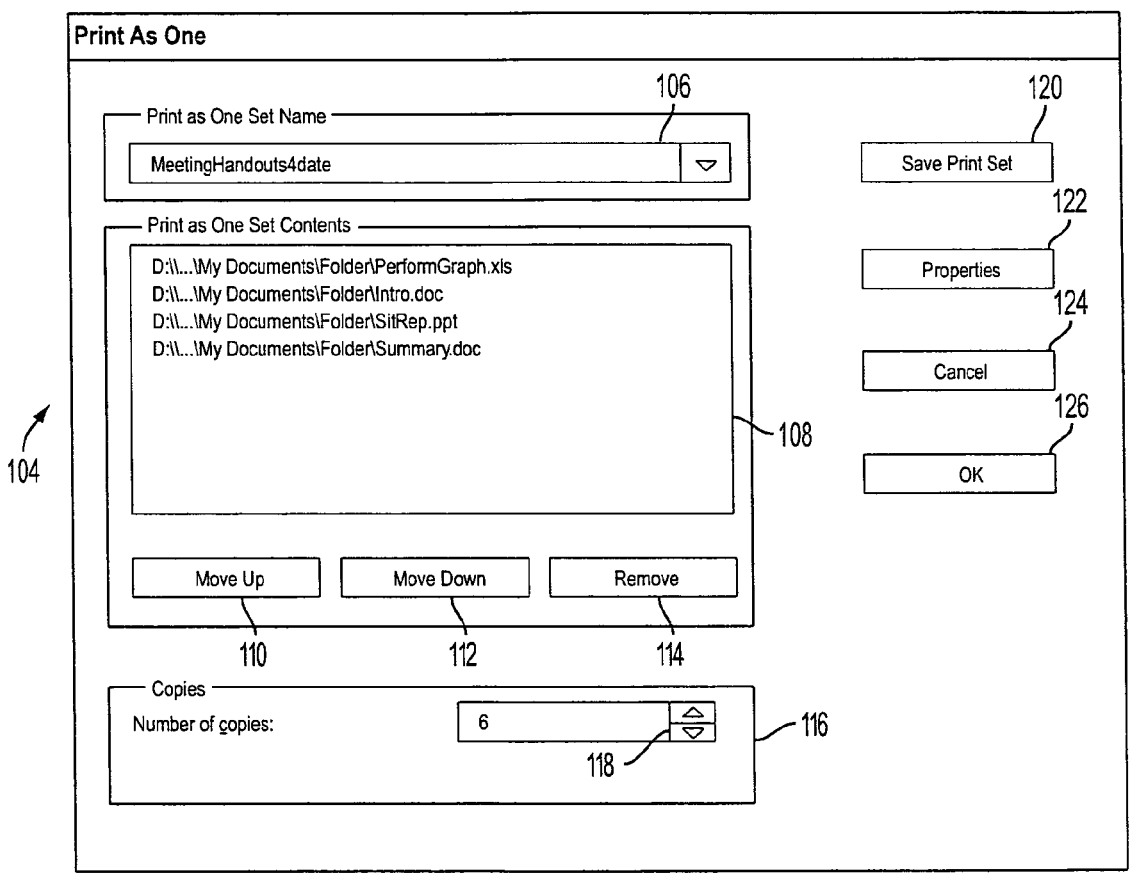
FIG. 5 is a "print as one" menu associated with the print driver of the workstation of FIG. 3.

In one exemplary embodiment, the print driver's pop-up menu 80 can include a "print as one" button 102. When the button 102 is selected, with additional reference to FIG. 5, a print as one menu 104 can be displayed on the display screen 58 in addition to or in replacement of the menu 80. The menu 104 serves as an interface between the user and the print driver 62 that, as will be described in more detail below, enables multiple items from one or more applications to be printed as a single print job, thereby enabling printing of one or more copies of a desired compound document. Like the menu 80, the menu 104 can be changed through the keyboard 60, the mouse 61, any other input device or means. The menu 104 generally enables a user to construct or build a compound print job comprising multiple items from one or more applications (i.e., allows concatenation of multiple items or files from one or more applications into one print job) and set and/or modify processing instructions associated therewith.

The menu 104 includes functional features (i.e., buttons, windows, pull-down menus, etc.) that enable the user to create a desired compound print job. The menu 104 of the illustrated embodiment includes a pull-down menu 106 wherein the user is able to select an existing compound print set for further modification or printing and/or creation and naming of a new compound print set. The menu 104 further includes a window 108 displaying all items currently comprising the selected compound print set. When menu 104 is accessed from menu 80, which is associated with the printing of an item from a particular application, the item is added to the window 108 such that the item is immediately viewable in the menu 104.

A series of buttons 110,112,114 can be provided for arranging and/or deleting listed items from the window 108 and thereby from the compound print set. A copies box 116 can be provided including a functional number of copies graphic 118 that enables a user to select the number of copies to be generated from the compound print set. Additionally, a number of buttons can be provided for processing the compound print set. For example, a save print set button 120 can be provided that allows the existing compound print set, represented in the window 108, to be saved for later printing and/or future modification, such as the addition of other items to the compound print set. A properties button 122 can be provided for accessing an additional menu or menus that enable additional parameters to be set in relation to the compound print set. For example, the properties button 122 could provide access to a properties menu of the printer 12 to enable printer finishing properties (e.g., stapling) to be set in relation to the compound print set. The properties menu accessed could be the same or similar to that accessed by the button 96 of the menu 80. A cancel button 124 can be provided for returning to the menu 80, and possibly removing the most recent item added to the compound print set (i.e., the item being printed when originally accessing the menu 80). Alternatively, the cancel button 124 could merely close the menu 104 without printing anything, however the most recently added item could remain in the compound print set (i.e., the print set could be automatically saved upon closure of the menu 104).

A print button 126 can also be provided that functions to instruct the print driver 62 to process the compound print set. More particularly, selection of the button 126 causes the print driver 62 to create a compound print job corresponding to the compound print set and send this compound print job to the printer 12. Of course, like menu 80, additional functions (or fewer functions) than those illustrated can be employed in the print as one menu associated with the print driver 62. Menu 104 is provided merely to illustrate one example print as one menu that can be associated with a print driver.

Figure 6:
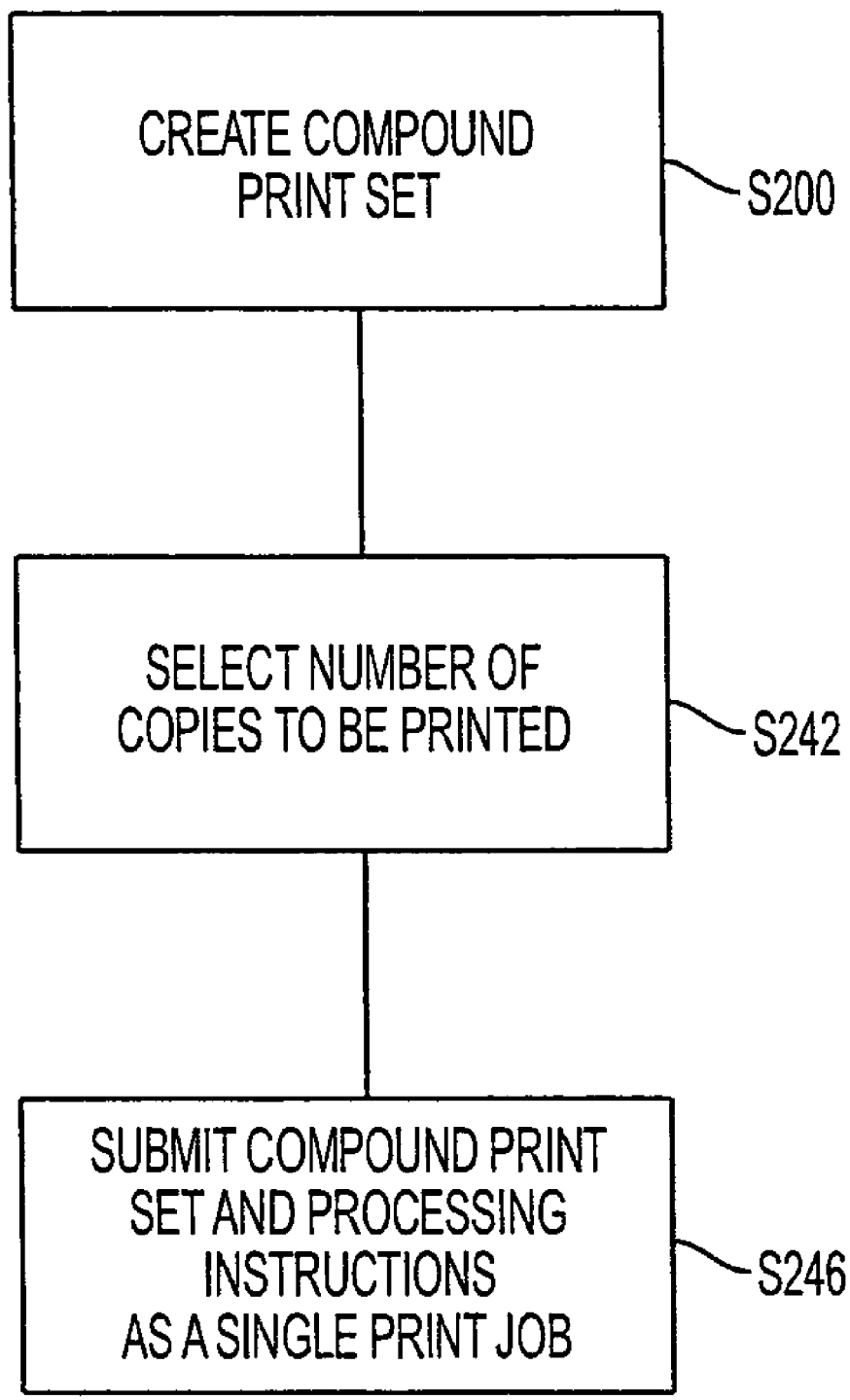
FIG. 6 is a block diagram illustrating a method for concatenating at least two independent items into a compound print job.
Figure 7:
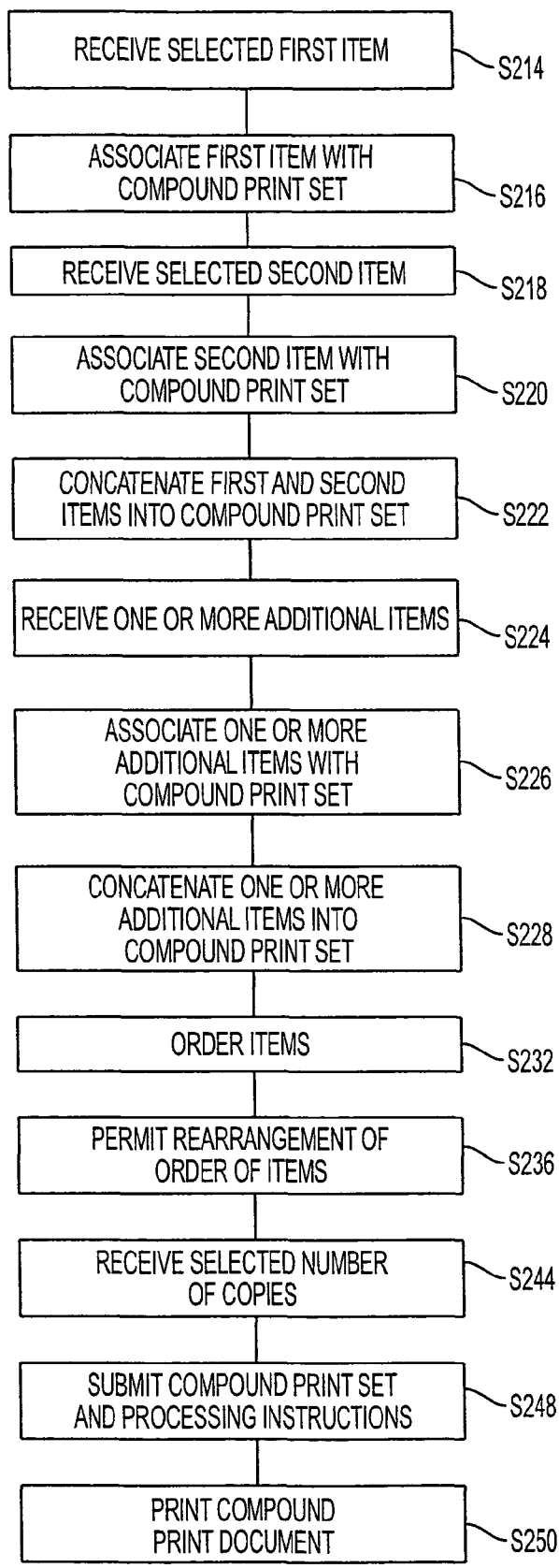
FIG. 7 is a block diagram illustrating a method for combining at least two independent items from one or more applications as a single print job.
Figure 8:
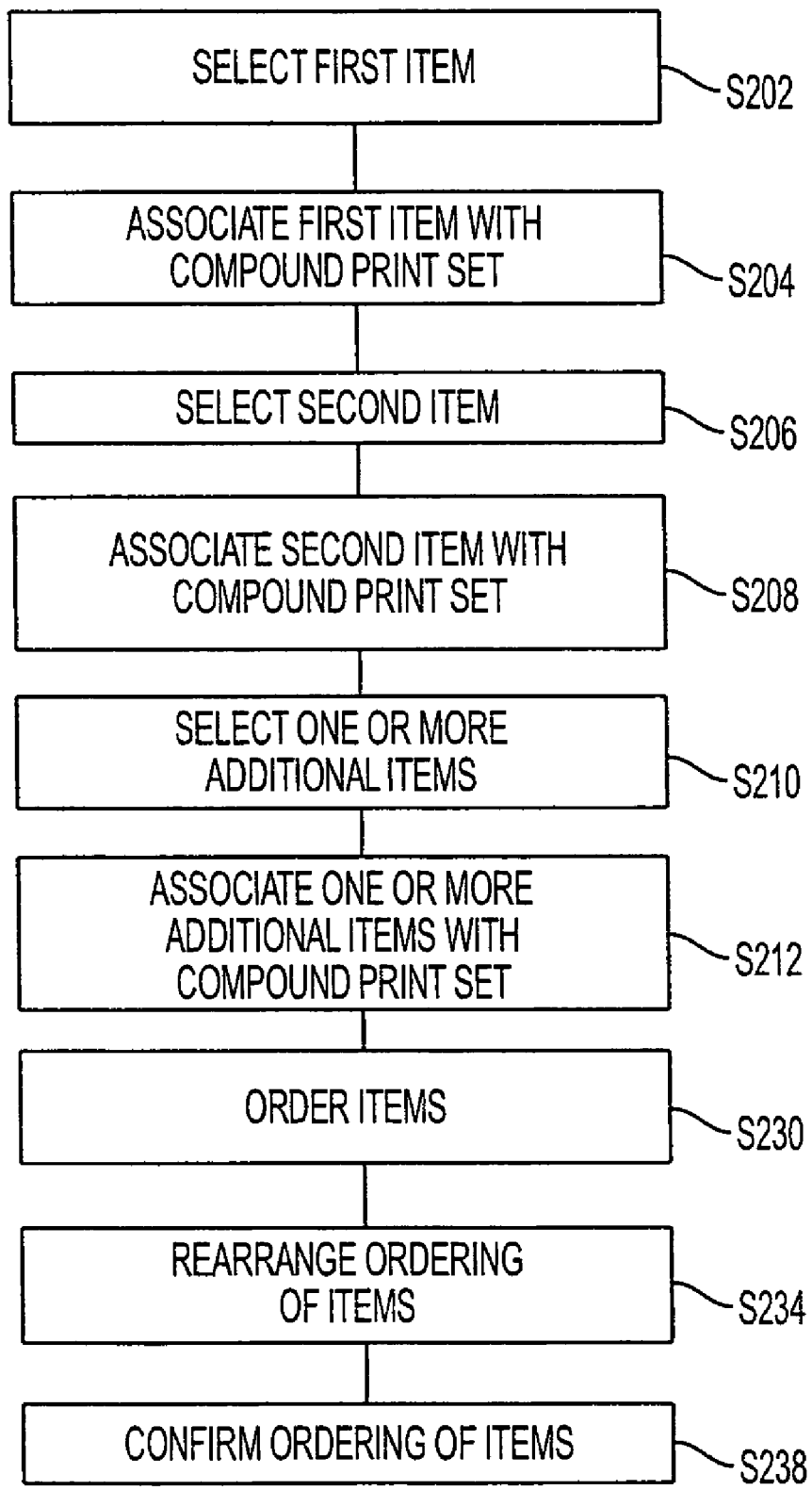
FIG. 8 is a block diagram illustrating a method of creating a compound print set.

With reference to FIGS. 6 and 7, a method for concatenating at least two independent items into a compound print job and a method for combining at least two independent items from one or more applications as a single print job will be described in connection with the printing system of FIG. 1. In step S200 of FIG. 6, a user creates a compound print set comprising a first item and a second item. The compound print set is representative of a compound print document the user desires the printer 12 to print. To create the compound print set, with additional reference to FIG. 8 (which shows exemplary process steps for creating a compound print set), the user selects a first item to be included in the compound print document (S202), associates the first item with the compound print set (S204), selects a second item to be included in the compound print document (S206), and associates the second item with the compound print set (S208). Optionally, the user can select one or more additional items to be included in the compound print document (S210) and associate the one or more additional items with the compound print set (S212).

More specifically, for example, with reference to the printing system 10, the user can open the first application 66 on the workstation 16 and execute a print command therein. Typically, based on the application 66, the print command will function to submit a first item to be printed to the print driver 62. For example, if the first application 66 is a word processing program, the print command could submit all pages in a specified file to be sent to the printer driver 66 and ultimately to the printer 12. Thus, in this example, the first item would be all pages in a specified file. In the illustrated embodiment, the print command of the application 66 accesses the print driver 62 through the operating system 64 in a conventional manner. Executing the print command in the first application 66 also causes the menu 80 to appear on the display screen 58 enabling the user to interact with the print driver 62

In most respects, the menu 80 of the illustrated embodiment is a conventional Windows® print menu, except that it includes the print as one button 102. Selecting the print as one button 102 causes the first item of the application 66 to be added, or selected for addition, to an existing or a newly created compound print set representative of a desired compound print document to be generated by the printer 12. More specifically, selecting the print as one button 102 represents a selection by the user of the first item to be included in the compound print document (S202). Thus, when the user selects the print as one button 102, the print driver 62 receives the selected first item to be included in a compound print document (S214 of FIG. 7).

Next, the print driver 62 associates the first item with a specified compound print set (S216). More specifically, the print driver 62 initially assigns, by default, the selected first item to a newly created compound print set and assigns a default name or identification to the newly created compound print set which is displayed at 106. The user is able to edit the default name, if desired. If the user desires to add the selected first item to an already existing compound print set (rather than to a newly created default compound print set), the user selects the desired compound print set (i.e., the specified compound print set) through drop-down menu 106 and the selected first item is then added to the preexisting compound print set. In either case, the items, including the first item, of a newly created or selected preexisting compound print set are displayed in the window 108. Thus, the user associates the first item with a compound document set either by allowing the default selection by the print driver 62 or by selecting a preexisting print set (S204). In the illustrated methods, the compound print set including the first item is saved so that additional items, such as the second item, can be added thereto. For this operation, the user selects the save print set button 120 and the compound print set is saved on the memory 54.

Next, the user can open the second application 68 on the workstation 16 and execute a print command therein. Executing the print command can function to submit a second item, corresponding to the second application 68, to be printed to the print driver 62. Like the first item and the first application 66, the second item can be an image or images and/or a page or pages to be printed from the second application. In the illustrated embodiment, the print command of the application 68 accesses the print driver 62 through the operating system 64 in a conventional manner, like that of the first application.

Executing the print command in the second application 68 again causes the menu 80 to appear on the display screen, this time in association with the second item, to enable the user to interact with the print driver 62 in connection with the second item.

Selecting the print as one button 102 (S206) causes the second item of the second application 68 to be added, or selected for addition, to an existing or a newly created compound print set representative of a desired compound print document to be generated by the printer 12. Again, like the first item, when the user selects the print as one button 102 in connection with the second item, the print driver 62 receives the selected second item to be included in a compound print document, such as the compound print document that includes the first item (S218 of FIG. 7).

In the illustrated method, the second item is added, or selected for addition, to the compound print set including the first item, thereby associating the second item with the compound print set including the first item (S208). Thus, though the print driver 62 may initially add the second item to a newly created default compound print set, the user can select the existing compound print set (by selecting its name or identification in the drop-down menu 106) including the first item that was saved on the memory 54. By selecting the existing compound print set, the second item is added and/or associated by the print driver 62 with that compound print set (S220); thus, the selected compound print set includes the first item and the second item (i.e., the first and second items are concatenated into one compound print set) (S222). When the concatenated compound print set is chosen in menu 106, the first and second items are listed or displayed in window 108.

In the same manner, one or more additional items can be selected for inclusion into the compound print set having the first and second items (S210) and these one or more additional items can be associated with this compound print set. Thus, the print driver 62 can receive the one or more additional items to be included in the compound print document (S224), the received one or more additional items can be associated with the compound print set having the first and second items (S226), and the items, including the first item, the second item and the one or more additional items, can be concatenated into the compound print set (S228). As will be appreciated by those skilled in the art, the combination of items included in a compound document set can vary. For example, two or more items of a compound document set can come from the same application or any combination of applications and, as discussed above, one or more of the applications need not reside on the memory 54 of the workstation 16.

As part of creating the compound print set in step S200, the items included in the compound print set can be ordered by the user (S230). In an exemplary embodiment, the items are initially ordered (i.e., by default) by the print driver 62 according to when the items were selected by the user to be included in the compound print set (S232). Thus, if the user causes the first item to be added to the compound print set prior to the second item, the first item will be ordered or sequenced before the second item. Accordingly, the user initially orders the items by selecting the items in a desired sequence (S230).

The user can rearrange the ordering of the items (S234), such as may be desirable prior to submitting the compound print set to the printer 12. For example, in the menu 104, the items are displayed in their present order in the window 108. If no rearrangement has occurred, the items are displayed in the order in which they were selected for inclusion in the compound print set. Using the buttons 110 and 112, the ordering of the times can be rearranged. Thus, the print driver 62 permits or allows rearrangement of the order of the items after they are initially ordered according to the sequence in which they were selected (S236). The user can confirm the ordering of the items after selecting the items and prior to submitting the compound print set to the printer 12 (S238). Confirming the order can be merely allowing the default ordering of the items to remain or can occur after rearranging the items. In any case, the user can be considered to have confirmed the ordering of the items in the compound print set whenever the user elects to send the compound print set to the printer 12, as will be described in more detail below.

Once the compound print set has been created, the user can select a number of copies of the compound document to be printed by the printer 12 from the compound print set (S242). For example, in the illustrated embodiment, the user can adjust the number of copies desired in box 116 of menu 104 using copy icon 118. The print driver 62 receives the selected number of copies of the compound document to be printed from the input provided by the user (S244). Alternatively, the selected number of copies can be determined by some other means (for example, the print driver 62 can default to a single copy or can default to the last number of copies selected). Using the properties button 122 of the menu 104, the user can also alter, modify and/or confirm various other parameters associated with the compound print set, such as finishing options. Finishing options can include, for example, binding or stapling, offsetting between copies, print quality, etc. The number of copies and any other parameters of the compound print set can be collectively referred to as processing instructions.

When ready, the user can submit the compound print set and the processing instructions, which include the selected number of copies, as single print job to the printer 12 to be printed (S246). More specifically, when ready, the user selects the OK button 126 to send the compound print set to the printer 12. When the button 126 is selected, the print driver 62 sends the compound print set and the processing instructions, which include the selected number of copies, as a single print job to the printer 12 (S248). When the print job is received by the printer 12, the printer can process the print job and print the selected number of copies of the compound print document (S250). The user can then retrieve the printed copies of the compound print document. If a banner or lead sheet is used, all copies can be included under a single banner or lead sheet.

Advantageously, the copies of the compound print document are printed as a single print job. Thus, any other print jobs, such as those sent from workstations 18 and/or 20 will not be interleaved within the items which comprise the compound print document. The disclosed method or methods can be readily implemented in software, such as print driver software, using known object or object-oriented software development environments. The print driver 62 and methods described herein can be readily implemented in software using any suitable systems or structures, devices and/or software known by those skilled in the applicable art without undue experimentation from the functional description provided herein together with a general knowledge of the computer arts.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for concatenating at least two independent items from at least one workstation including a memory, the method comprising:
    retrieving a first item from a first application;
    executing a command to print said first item;
    submitting by an operating system said first item to a printer driver residing on said memory;
    selecting from a first interface displayed by said printer driver a selection for printing said first item in a compound print set;
    displaying by said printer driver a second interface for constructing said compound print set including at least a menu of existing compound print sets;
    associating by said printer driver said first item as first content in a new compound print set;
    reassociating said new compound print set as a specified compound print set with a user-specified name;
    creating said specified compound print set by said printer driver;
    saving said specified compound print set in said memory and storing said specified print set with the existing compound print sets;
    performing associated actions on said workstation not related to forming and printing said specified compound print set;
    retrieving a second item from said first or a second application;
    executing a second command to print said second item;
    submitting by said operating system said second item to said printer driver;
    selecting from said first interface displayed by said printer driver said selection for printing said second item in said compound print set;
    displaying by said printer driver said second interface for constructing said compound print set, said second interface including said menu including at least said specified compound print set;
    associating by said printer driver said second item as said first content in a second new compound print set;
    reassigning said second item to said specified compound print set;
    submitting said specified compound print set for print output;
    after completing a preparation of said specified compound print set, sending by the printer driver said specified compound print set to an associated printer; and,
    processing said specified compound print set by said associated printer for printing said compound print set as a single job;
    wherein said print driver also provides for later and repeated retrievals of said specified compound print set for additional printing.

2. The method of claim 1, further including:
    retrieving and executing additional print commands for one or more additional items to be included in said specified compound print document; and
    associating said one or more additional items with said specified compound print set.

3. The method of claim 2 further including:
    ordering said first item, said second item and said one or more additional items according to when said items were selected to be included in said specified compound print set;
    confirming said ordering of said first item, said second item and said one or more additional items after selecting said first and second items, but prior to submitting said specified compound print set as a single print job.

4. The method of claim 3 further including:
    rearranging said ordering of said first item, said second item and said one or more additional items prior to confirming said ordering.

5. The method of claim 4 wherein said second item is from said second application.

6. The method of claim 1 further including:
    confirming an ordering of said first item and said second item prior to submitting said specified compound print set as said single job.

7. The method of claim 1 further including:
    rearranging an ordering of said first item and said second item prior to submitting said specified compound print set as said single job.

8. The method of claim 1 further including:
    adding finishing attributes to said specified compound print set.

9. The method of claim 1 wherein said at least one workstation comprises a personal computer.

10. A method for combining at least two independent items from one or more applications as a single job using at least one workstation including a memory, said method comprising:
    retrieving a first item from a first application;
    executing a print command for said first item;
    submitting by an operating system said first item to a printer driver residing on said memory;
    selecting from a first interface displayed by said printer driver a compound print function;
    displaying by said printer driver said first item as first content in a newly created compound print set;
    associating by said printer driver said newly created compound print set with a default name;
    renaming said newly created compound print set with a user-specified name;
    re-associating by said printer driver said newly compound print set as a specified compound print set with the user-specified name;
    saving by said printer driver said specified compound print set in said memory;
    after associating said first item in said specified compound print set, retrieving a second item from said first or a second application;
    executing said print command for said second item;
    submitting by said operating system said second item to said printer driver;
    selecting said compound print function;
    displaying by said printer driver, on a second interface, a pull-down menu of existing compound print sets including at least the specified compound print set;
    selecting said specified compound print set from said pull-down menu;
    associating by said printer driver said second item as second content in said specified compound print set;
    receiving by said printer driver user-submitted processing instructions selected from said second interface displayed by said printer driver;
    after applying said processing instructions, submitting said specified compound print set for print output;
    sending by said printer driver said specified compound print set to a printer; and processing last said specified compound print set by said printer for printing said specified compound print set as a single job;

wherein said print driver also provides for later and repeated retrievals of said specified compound print set for additional printing.

11. The method of claim 10 further including:

receiving one or more additional items to be included in said specified compound print set; and concatenating said additional items into said specified compound print set.

12. The method of claim 10 further including concatenating said first and second items by ordering said first and second items according to a sequence in which said first and second items were received.

13. The method of claim 12 wherein concatenating said first and second items further includes:

allowing rearrangement of an order of said first and second items.

14. The method of claim 10 wherein said first item is received from said first application and said second item is received from said second application and said applications are included on a common workstation.

15. The method of claim 10 further including printing a selected number of copies of said specified compound print set, wherein said selected number of copies are included in said processing instructions selected from said interface displayed by said printer driver.

16. A printing system including a printer and at least one workstation operatively connected to said printer, wherein said at least one workstation comprises:

at least one input/output device connecting said at least one workstation to said printer;

a controller connected to said at least one input/output device;

a memory connected to said controller for retaining at least an operating system, a first application, a second application, and a printer driver;

said operating system operative to submit an item from said first or second application to said printer driver;

said printer driver operative to:

display a selection for a compound print function, display said item as first content in a newly created compound print set when said compound print function is selected, associate said newly created compound print set with a default name, reassociate said newly created compound print set as a specified compound print set with a user-specified name, save said specified compound print set in said memory, display a pull-down menu of existing compound print sets including at least the specified compound print set when said compound print function is selected for at least a second item, associate said second item as second content in said specified compound print set, display selections for processing instructions, receive user-submitted processing instructions, and, send said specified compound print set for subsequent processing of print output upon receipt of a user-instruction to print said specified compound print set; and the printer for processing and printing said specified compound print set as a single job;

wherein said print driver also provides for later and repeated retrievals of said specified compound print set for additional printing.

17. The printing system of claim 16 wherein said at least one input/output device includes a display screen and a keyboard that enables a user to select and send said first and second items to said printer driver, enables said user to enter said processing instructions including at least a number of copies to be printed, and enables a user to instruct said printer driver to send said single job to said printer.

18. The printing system of claim 16 wherein said printer is a xerographic printer and includes:

a photoreceptive member for being uniformly charged across a portion thereof;

an imager connected to an electronic subsystem for selectively dissipating said charged portion of said photoreceptive member for recording a latent image corresponding to said single job; a developer for developing a toner image on said photoreceptive member from said latent image;

a transfer station for transferring said toner image from said photoreceptive member to one of a plurality of print media sheets of a storage member; and a fuser for permanently fixing or fusing said toner image to said one of said plurality of print media sheets.

* * * * *